Nov. 24, 1964   H. J. McCARRICK   3,158,718
MOTION AMPLIFICATION SWITCH MEANS
Filed June 5, 1961   6 Sheets-Sheet 4

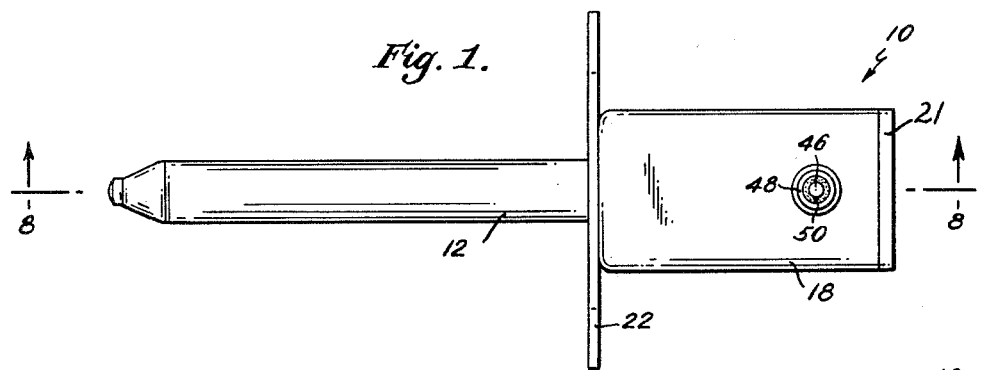
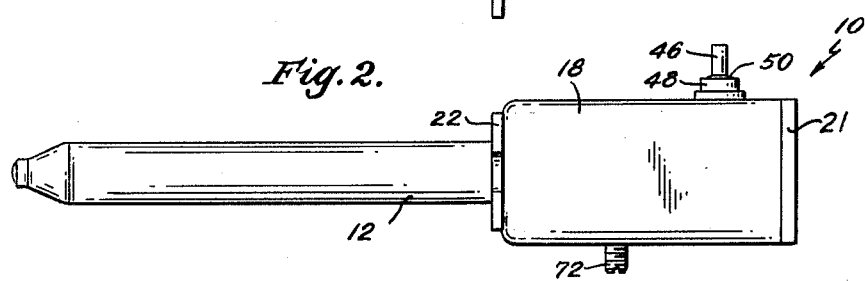
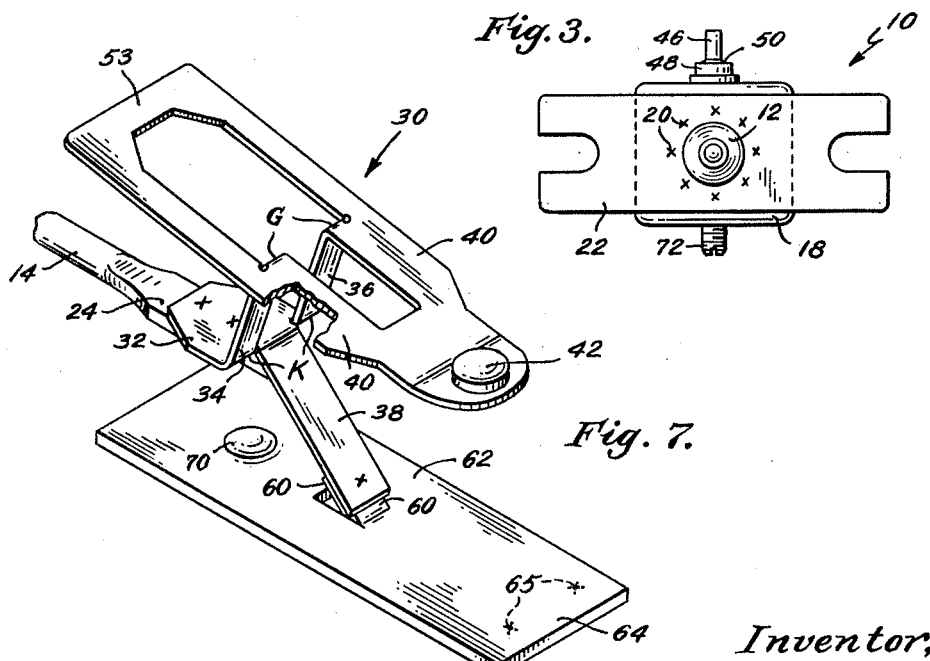
Inventor,
Henry J. McCarrick,
by Harold Levine
Att'y.

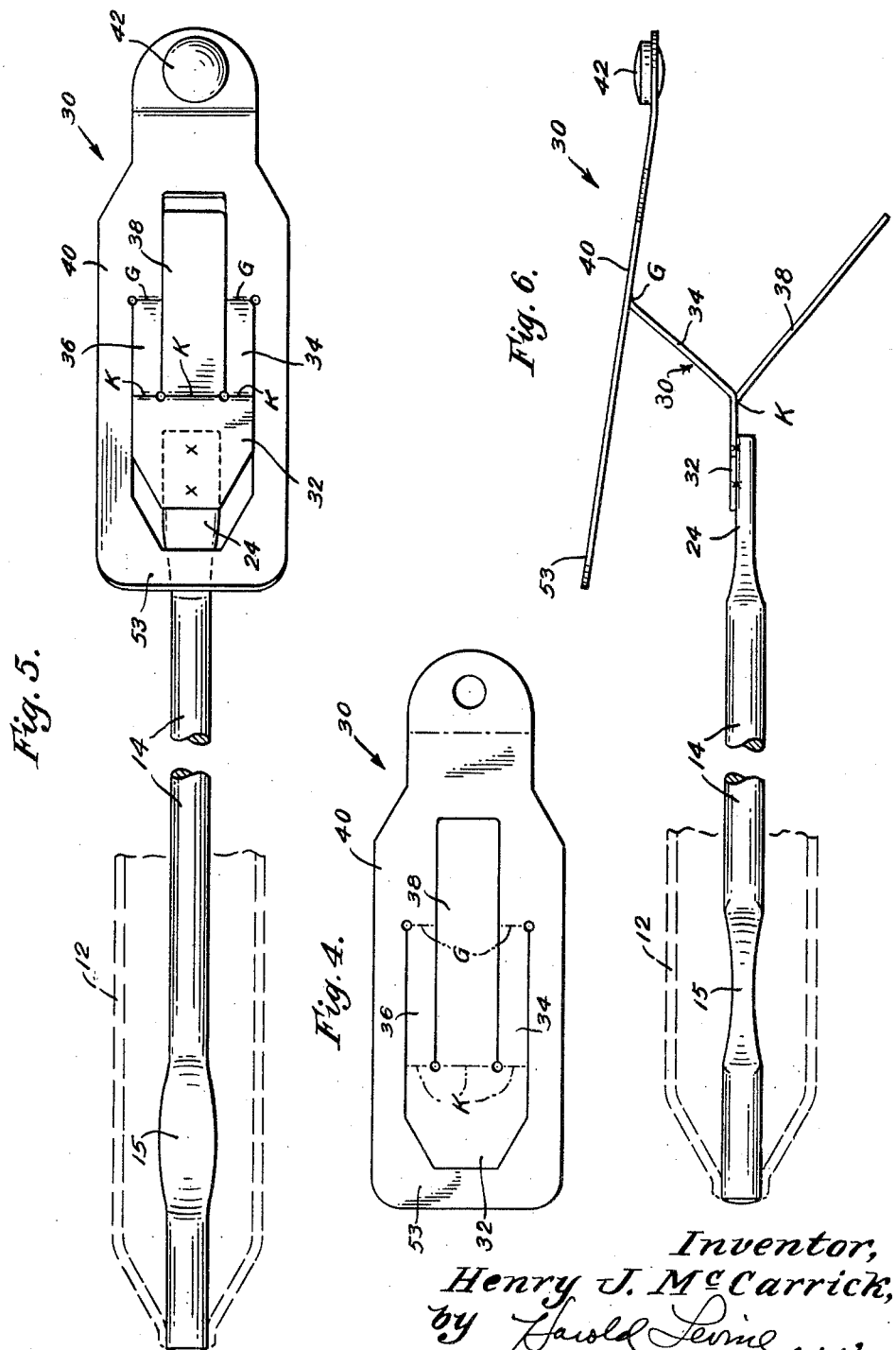

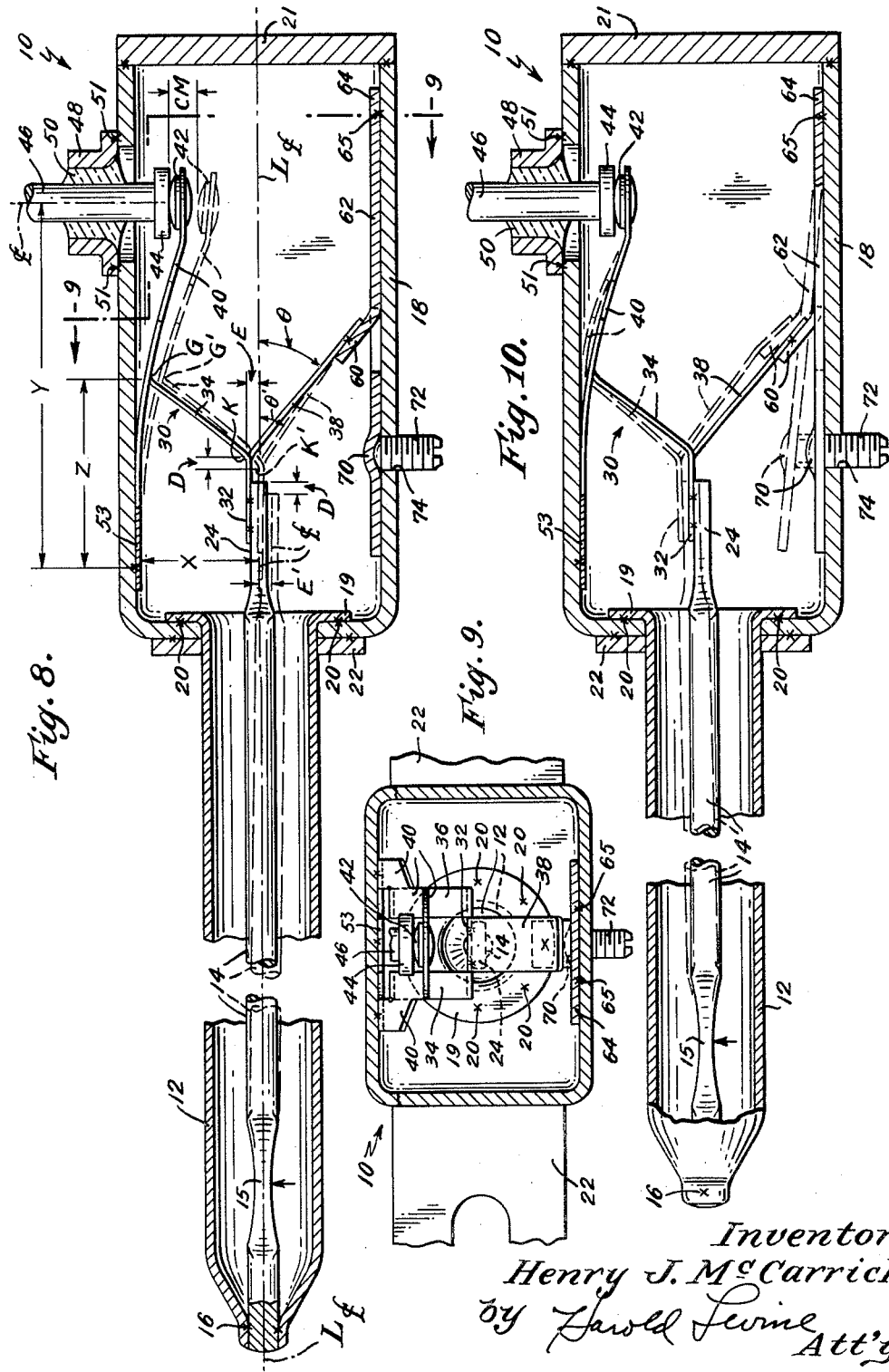

Inventor,
Henry J. McCarrick,
by Harold Levine
Att'y.

Nov. 24, 1964     H. J. McCARRICK     3,158,718
MOTION AMPLIFICATION SWITCH MEANS
Filed June 5, 1961     6 Sheets-Sheet 5
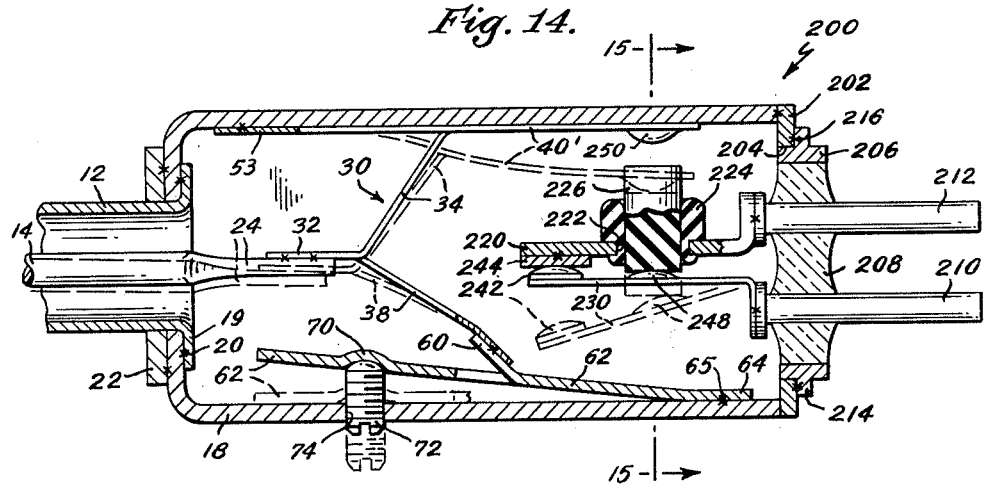
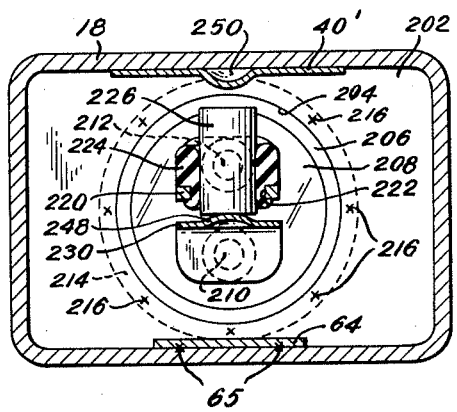
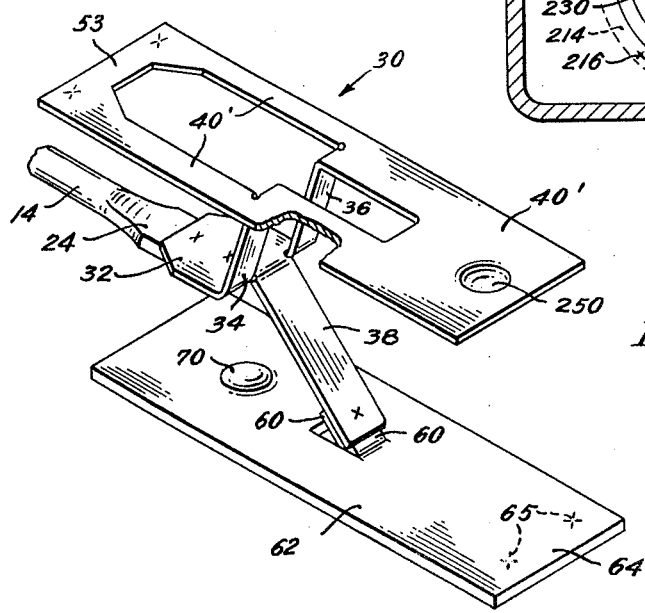
Inventor,
Henry J. McCarrick,
by Harold Levine Att'y.

Nov. 24, 1964 H. J. McCARRICK 3,158,718
MOTION AMPLIFICATION SWITCH MEANS
Filed June 5, 1961
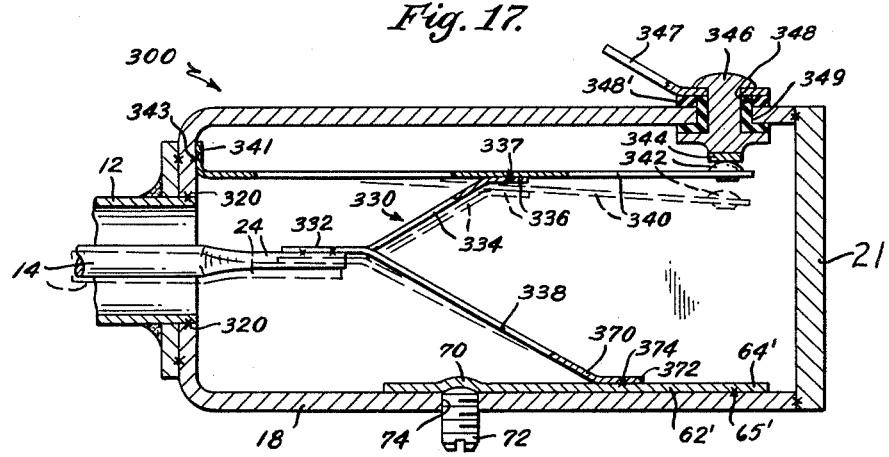
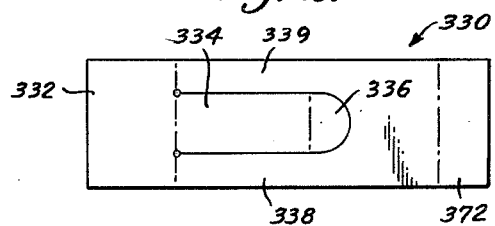
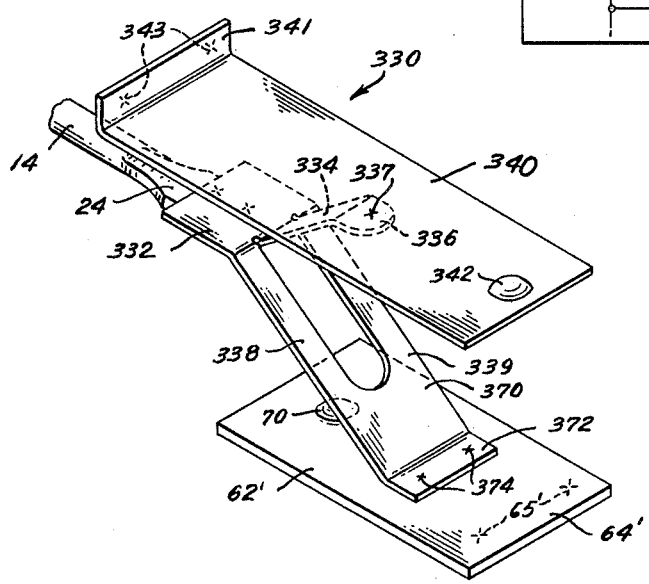
Inventor,
Henry J. McCarrick,
by Harold Levine
Att'y.

United States Patent Office 3,158,718
Patented Nov. 24, 1964

3,158,718
MOTION AMPLICATION SWITCH MEANS
Henry J. McCarrick, Middleboro, Mass., assignor to Texas Instruments Incorporated, Dallas, Tex., a corporation of Delaware
Filed June 5, 1961, Ser. No. 114,733
28 Claims. (Cl. 200—137)

This invention generally relates to motion amplification means useful for condition responsive devices which generate actuating movement, and to thermostatic switches employing such motion amplification means.

The instant invention provides a novel means for amplifying relatively small movements generated by condition responsive devices, e.g., thermostatic switches, to effect actuation. In its more particular aspects, the instant invention also provides a calibrating means by which a thermostatic switch or device incorporating my invention can be rendered operable over substantially wide ranges in temperature or in varying actuating conditions.

Among the objects of my invention may be noted the provision of a motion amplifying means of the class described which is simple and economical in form, low-cost, and dependable in operation; the provision of a motion amplifying means which provides for substantial amplification of motion generated by a condition responsive or thermally responsive device; and the provision of a simple and inexpensive calibrating means which provides for precise, accurate and fine calibration adjustment, and co-operates with the motion amplification means to render the constructions with which they are employed operable at relatively narrow temperature differentials, which temperature or condition operating points may be selected from a wide range of temperature or varying actuating conditions and the provision of motion amplifying means which translates motion in one direction into amplified motion in another direction.

Other objects will be in part apparent and in part pointed out hereinafter.

The invention accordingly comprises the elements and combinations of elements, features of construction and arrangements of parts which will be exemplified in the structures hereinafter described, and the scope of the application of which will be indicated in the following claims.

In the accompanying drawings, in which several of various possible embodiments of the invention are illustrated:

FIG. 1 is a plan view of a thermostatic switch embodying one form of my invention;

FIG. 2 is a front elevation of the switch shown in FIG. 1;

FIG. 3 is a left-hand elevation of the switch shown in FIG. 2;

FIG. 4 is a plan view of a blank employed in forming the motion amplification means, according to the first embodiment of my invention;

FIG. 5 is a plan view of a subassembly of the switch shown in FIGS. 1-3;

FIG. 6 is a front elevation of the subassembly shown in FIG. 5;

FIG. 7 is an isometric view of a portion of the switch shown in FIGS. 1-3, including a portion of the subassembly shown in FIGS. 5 and 6;

FIG. 8 is a sectional view, taken on line 8—8 of FIG. 1, with relative movement between parts due to thermal change being indicated in dashed lines;

FIG. 9 is a view taken on line 9—9 of FIG. 8;

FIG. 10 is a view similar to FIG. 8, with relative movement between parts resulting from calibration adjustment being indicated in dashed lines;

FIG. 14 is a view similar to FIG. 8, and partly broken away, of a thermostatic switch according to a third embodiment of my invention;

FIG. 15 is a view taken on line 15—15 of FIG. 14;

FIG. 16 is an isometric view, with parts broken away, of a subassembly of the switch shown in FIGS. 14 and 15;

FIG. 17 is an elevational view similar to FIG. 14, partly in section, of a switch according to yet a further embodiment of my invention with relative motion of parts due to thermal change being indicated in dashed lines;

FIG. 18 is a plan view of a blank forming a part of the motion-amplification means for the embodiment of FIG. 17; and FIG. 19 is an isometric view, with parts broken away, of a subassembly of the switch shown in FIG. 17.

Figure 12:
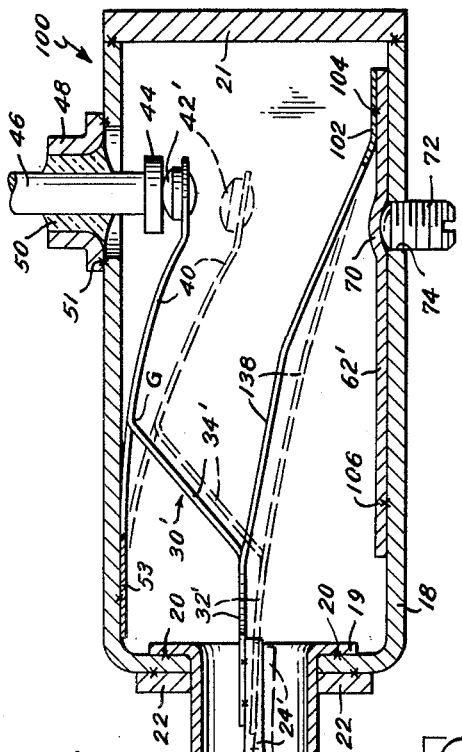
FIG. 12 is a view similar to FIG. 8, of a second embodiment according to my invention, with relative motion of parts due to thermal changes being indicated in dashed lines.

Dimensions of certain of the parts as shown in the drawings have been modified and/or exaggerated for purposes of clarity of illustration.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the manufacture of condition responsive actuators which generate relative movement between parts for actuation purposes, the problem of amplifying such movements presents itself where such relative movements are small. This problem is particularly acute when the condition responsive actuating device is a thermostatic switch. In thermostatic switches, it is desirable to have relatively large actuating movement result from relatively narrow temperature changes to provide for relatively narrow temperature differential operation. In many prior thermostatic devices, the relative actuating motion generated in response to temperature changes, generally takes place over the entire range of temperature exposure, with the result that the thermostat's temperature operating range is limited.

The present invention provides a simple and inexpensive means for affording substantial amplification of the relative motion generated by the thermal actuator, and in addition, provides a calibrating means which can render the thermostatic switch operable over a wide range of temperatures and at the same time, affords relatively narrow temperature differential operation. In thermostatic devices made according to my invention, positive or actual amplified actuating movement or displacement in the device does not take place until the device approaches near to its temperature operating point, as determined by its calibration adjustment. This advantageously affords narrow temperature differential operation.

Referring now to the drawings, there is shown in FIGS. 1–10, a first embodiment of my invention in the form of a thermostatic switch, generally indicated by numeral 10, chosen to illustrate the principle of my invention. As best seen in FIG. 8, switch 10 includes a thermally responsive differential actuator comprising two elongated members 12 and 14, suitably connected together at their ends for interaction under variations of temperature. Member 12 is preferably in the form of a tube, and is preferably formed of a material having a relatively high coefficient of expansion, such as brass. Member 14 is preferably in the form of a rod, and is formed of a material having a relatively low coefficient of thermal expansion, such as Invar for example. Rod 14 is secured to the closed-end portion of tube 12, as by welding at 16, as best seen in FIG. 8. The open end of tube 12 is mounted on and supported by a tubular switch housing 18, formed of electrically conductive material, e.g., stainless steel. Tube 12 is provided with a flange 19, which is fixedly secured to base or housing 18, as by welding at circumferentially spaced points 20. Switch 10 is also provided with a transversely extending mounting bracket 22 welded thereto, as shown, and as best seen in FIG. 3. Rod 14 is longitudinally disposed within tube 12, with its free end 24 thereof projecting into housing 18. It will be clear that when rod 14 and tube 12 are exposed to increased temperature conditions, that differential expansion will result in relative movement between these parts, in a manner well known in the art. End 24, in the absence of a restraining influence, will generally move axially upon expansion of tube 12. Such relative movements as are produced by rod and tube devices of the type described above are generally small. This relatively small movement is amplified by a motion amplification generating device according to my invention, which is indicated in the drawings generally by numeral 30.

Motion amplification device 30, as best seen in FIGS. 6, 7, 8 and 10, is substantially Y-shaped in configuration and includes a base leg 32, a pair of legs 34, 36, and leg 38 which is interconnected with legs 34, 36 and diverges therefrom. Legs 34, 36 and leg 38, in elevation (see FIGS. 6 and 8) provide a bifurcated or bicornous, V-shaped arrangement, which with base leg 32, provides the Y-shaped configuration described above. Base leg 32 is connected, as by welding, with the free end 24 of rod 14 for movement therewith. Leg 38 is connected, adjacent its free end, to a struck-out integrally formed portion 60 of a support member 62, which is connected at one end 64 thereof to housing 18, as by welding at 65, to restrain or inhibit movement of leg 38 in a direction longitudinally or axially thereof. Also integrally formed or interconnected with legs 34 and 36 is a flexible actuator member 40. As best seen in FIGS. 6–8, legs 34 and 36 are interconnected with actuator 40 at a portion G intermediate the ends thereof. Actuator member or arm 40, in the embodiment of FIG. 1, includes an electrical contact 42 mounted on and electrically connected to one end thereof. Actuator member 40 is electrically connected to and cantilever mounted on housing 18, as by welding, adjacent one end 53 thereof for pivotal or rotary movement relative to housing 18, as shown.

Motion amplifying device 30 and actuator member 40 are formed of electrically conductive, flexible sheet material, such as for example, Haynes 25 alloy, an alloy consisting essentially by weight of 19%–21% chromium, 14%–16% tungsten, 9%–11% nickel, 0.15% max. carbon, 2.0% max. iron, and the balance cobalt. In the embodiment of FIGS. 1–10, 11–13, and 14–16, motion amplifying device 30 and actuator member 40 are formed integrally and can simply and inexpensively be produced by stamping and forming.

In FIG. 4 is shown a plan view of a blank of the motion amplification member 30 and the actuator member 40, before forming and bending thereof, to the Y-shaped configurations shown in FIGS. 6, 8 and 10. Forming of the blank is accomplished by bending at the locations of the broken lines in FIG. 4, to provide the formed configuration shown in FIGS. 5, 6 and 8. In the formed condition, flexible and diverging legs 34, 36 and 38 and base leg 32 are all interconnected at the bend line or apex indicated at K in the drawings. The connection or bend line between legs 34, 36 and actuator member 40 is indicated at G in the drawings.

Referring now to FIGS. 8 and 10, electrical contact 42 is adapted to move into and out of engagement with a fixed or stationary electrical contact 44, provided by an exteriorly extending electrically conducting terminal 46 mounted on base or housing member 18. Switch 10, as illustrated, forms part of a grounded type circuit with housing 18, serving as a terminal. Switch 10 may be of the hermetically sealed type. The open end of housing 18 is closed and hermetically sealed by a metallic cover member 21 which is welded to housing 18, as shown. Terminal 46 is mounted in a conventional glass-to-metal header provided by a flanged ring or sleeve 48 and a glass sealant 50, as shown in FIGS. 8 and 10, to fixedly position and mount terminal 46 in electrically insulated relation to housing 18 and to preserve the hermetically sealed integrity of switch 10. Ring 48 is welded to casing or housing 18, as at 51.

Operation of switch 10, as thus far described, is as follows. When switch 10 is subjected to a predetermined increase of temperature, the tube 12 and rod 14 will expand differentially to generate a relative movement therebetween, with the result that end 24 of rod 14 will move downwardly and to the left from the solid to the dashed line positions, shown in FIG. 8. The relatively small axial or longitudinal movement or displacement of rod 14, labeled D in FIG. 8, as will be explained in greater detail below, is amplified by device 30 and is transmitted to actuator arm 40 to move contact 42 from its solid-line to its dashed-line position, as shown in FIG. 8. The amplified movement resulting in the movement of contact 42 from the solid to the dashed line position shown in FIG. 8, is labeled CM in this figure of the drawing, and represents the cumulative effects of three distinct motion amplification effects or actions generated by means 30. Rod 14, as pointed out above, in the absence of restraining influences will generally move only axially or longitudinally a distance which approximates distance D in FIG. 8 of the drawing, upon expansion of tube 12 at the aforesaid increased increment of temperature. However, end 24 of rod 14, according to my invention, is constrained to pivot under this increased temperature condition because of its connection with leg 32 and leg 38, which is restrained against movement longitudinally thereof by its connection with support member 62. Rod 14 will thus pivot from the solid to the dashed line positions shown in FIG. 8 about a necked-down portion 15 thereof, as a fulcrum, as suggested by the arrow in FIG. 8. This pivotal movement of rod 14 is resolved into two displacements; a relatively small displacement longitudinally or axially of the rod, indicated in FIG. 8 by the letter D, and a vertical or transverse amplified displacement of the rod indicated by the letter E. Distance E represents an amplification of distance D according to a first one of the three motion amplification effects or actions mentioned above. The motion amplification factor $E/D$ is a function of the co-tangent of the angle that arm 38 makes with the longitudinal centerline of the tube 12 and switch 10 which is labeled as ℄ in FIG. 8. In FIG. 8, the initial or starting angle is indicated as θ and the final position (leg 38 having moved to the dashed-line position on predetermined temperature change) is θ'. It is clear that as the angle changes from θ to θ' the co-tangent of the angle also changes. It will be clear that the amplification factor at any instantaneous position of arm 38 in moving from the solid to the dashed-line position will be the function of the co-tangent of the corresponding instantaneous angle Θ, which may readily be calculated. Since the co-tangent value of Θ will always be greater than 1 (one) when Θ is less than 45°, it will be clear that angle Θ should be less than 45° where motion amplification according to this first effect or action is desired. Where amplification according to this first effect is desired and Θ therefore is less the 45°, it will also be understood than the smaller than 45° that starting Θ is, the greater will be the amplification factor for a given value of distance D, which distance D is a function of the differential expansion of rod 14 and tube 12 at a given temperature.

The longitudinal and transverse displacement of junction K of motion amplifying means 30 is also respectively substantially equal to distances D and E, since point K is substantially rigidly connected with end 24 of rod 14 through relatively short base leg 32. The displacement distance D is amplified and transmitted to contact actuator arm 40 to contribute a portion of the amplified contact-opening distance CM, according to a second one of the three motion amplification effects or actions mentioned above. The amount that axial displacement D is amplified and is translated into part of the contacts-opening distance CM, depends on the relative ratios of the lever arms Y and X. The amplification of distance D, according to this second effect, results from moments which are uniquely generated by motion amplification means 30 and its connection with actuator arm 40 at point G. Mathematically, this amplification is equal to $D(Y/X)$ where:

Y is the distance from the vertical centerline of contact 44 to the point of connection of portion 53 of actuator arm 40 to casing 18, as seen in FIG. 8; and X is the transverse lever arm distance from the centerline of end 24 of rod 14 to the portion 53 of actuator arm 40, as seen in FIG. 8.

The dimensions of Y and X are selected so that the fraction $Y/X$ is always greater than 1 (one). It can thus be seen that substantial leverage is afforded by this arrangement for amplifying the motion D to contribute to the cumulative amplified contacts-opening motion CM. It will be clear that distances or dimensions Y and X may be varied to vary the amount of amplification according to this second amplification effect or action.

The third one of the motion amplification effects or actions afforded by the motion amplification means 30 and actuator 40 involves a further amplification of amplified distance or displacement E, which resulted from the first effect or action described above. The amplified motion resulting from this third effect also provides part of the motion amplified contacts 42, 44 opening distance CM. The contact displacement increment to distance CM added by the amplified motion of this third effect is equal to $E(Y/Z)$ or the distance E times the ratio of $Y/Z$ where:

Y is the longitudindal distance from the vertical centerline of the contact 44 to the point of connection between portion 53 of actuator member 40 and housing 18, as seen in FIG. 8; and Z is the lever arm distance from G (the junction or connection between legs 34, 36 and actuator member 40) to the point of connection of portion 53 of lever arm 40 to housing 18, as seen in FIG. 8.

Summarizing, the cumulative motion amplification effects of the second and third effects or actions, mathematically, it may be stated that the amplified contact opening distance $CM = E(Y/Z) + D(Y/X)$ where distance E may be characterized as an intermediate amplified motion.

Thus, it can be seen from the above, that the amplified contact motion displacement, as represented by the letters CM in FIG. 8, represents the cumulative effects of three distinct motion amplification generating effects or actions. It can also be seen that legs 34, 36 and 38 each function as motion amplification generating members in transferring forces and creating the various moments, etc. which result in the above-described motion amplification effects or actions.

In the arrangement shown in FIG. 8, upon differential expansion between rod 14 and tube 12, when the parts move from the solid line to the dashed line positions, base leg 32, motion amplification generating members or legs 34, 36 and 38, and member 62, will act as tension members and the portion of the contact-carrying arm 40, intermediate point G and portion 53 thereof, will act as a compression member.

It should be understood that the actuating motion of arm 40, namely distance CM, can be employed to actuate devices other than electrical contacts or switches. For example, this motion CM could be used to operate any mechanical assembly that requires work input, such as for example, a valve or a toggle mechanism.

The present invention also provides means for calibrating the device to afford relatively narrow temperature differential operation which narrow temperature operating limits may be selected from a wide range in temperature. Plate-like support member 62 is provided with a dimpled portion 70 adjacent the free end thereof. Switch 10 includes a rotatable threaded member 72 disposed and received in threaded engagement within a threaded aperture 74 provided by housing 18. The upper end of screw 72 is received and nested within dimpled portion 70, as best seen in FIG. 10, to effect pivotal or rotary movement of support member 62 relative to housing 18, as shown. Upon suitable rotation of screw 72 within its threaded aperture 74, member 62, motion amplification means 30, rod 14 and actuator member 40 will be moved from the solid to the dashed line position, as shown in FIG. 10, to effect calibration of device 10. It will be noted that end 24 of rod 14 is moved upwardly, as shown in FIG. 10, to the dashed line position upon calibration. It will be seen that by moving the parts to the dashed line positions, as shown in FIG. 10, each of the parts are initially loaded or prestressed, which prestressing must first be relieved upon temperature rise to move the parts to the solid line positions shown in FIGS. 8 and 10, before further movement to the dashed line position of FIG. 8 can take place to effect opening of contacts 42 and 44. Moving rod 14 from the solid to the dashed line position in FIG. 10, upon calibration, results in stressing or placing rod 14 in some degree of compression which results in an increase of the temperature required for actuating contacts 42, 44. If rod 24 is moved downwardly (as seen in FIG. 8) by calibration, the result will be a decrease in compression of rod 14 or even creation of a tensile stress therein which results in decreasing the temperature required for actual opening of the contacts.

It can thus be seen from inspection of FIG. 10 and angular relationships between parts of the motion amplication means 30 and their connection with support 62, and actuator member 40, etc. that relatively large displacements of adjusting screw 72, means 30, support 62 and actuator 40 results in relatively small change of motion for rod 14, thereby providing for precise fine or close temperature adjustment. It will be seen from the above that advantageously, no motion effective to actuate the contacts will take place until the switch is at or near its operating temperature (as determined by the calibration adjustment) has been reached, thereby affording relatively narrow temperature differential operation.

The calibrating means according to my invention avoids the drawbacks presented by prior constructions which depend for calibration upon changing the physical spacing or relationship existing between the thermal actuator and output mechanism, e.g., switch, valve, lever, etc., which in the case of switch 10, would be contacts 42 and 44. The arrangement, according to my invention, is advantageous in that, although the thermally responsive actuator is adjustable for temperature operation, calibration thereof is far less dependent upon if not totally independent of changing the relationships between the actuator arm 40 and the switch assembly. In contrast to many prior constructions it is not necessary to directly change the physical spacing or relationship between the actuator and switch (for example see the embodiment of FIGS. 14–16) to effect calibration of the switch, although such movement may take place incidentally in some embodiments (as in that of FIGS. 1–10) upon calibration. Further, there is considerably less dependence upon frictional, fixed or rigid surfaces of reference to mate for effecting calibration of the device in contrast to many prior constructions. This advantageously avoids problems such as the necessity for consistently mating surfaces at exact locations, maintaining constant surface and pressure engagement conditions, as well as avoiding the necessity for eliminating variable surface contact friction as an influencing factor of temperature calibration. This arrangement renders switch 10 operable over a wide range of temperature wherein the upper limit of the temperature range will be limited only by availability of material suitable for high temperature operation. As an example, switches according to my invention have operated over a temperature range of as much as from −40° F. to 1650° F.

Further, at such high temperature operation as may be encountered by switch 10, the motion amplifying means 30, is stressed much lower than would otherwise be the case with a motion amplification device having a lesser number of motion amplification generating members.

It will be understood that after the device 10 has been calibrated by appropriate rotation of screw 72, a sealing compound such as solder is applied about screw 72 to maintain the hermetically sealed integrity of the switch 10.

Figure 11:
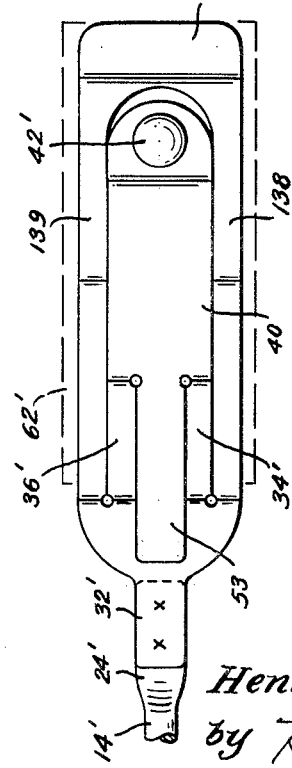
FIG. 11 is a plan view of a subassembly according to a second embodiment of my invention.
Figure 13:
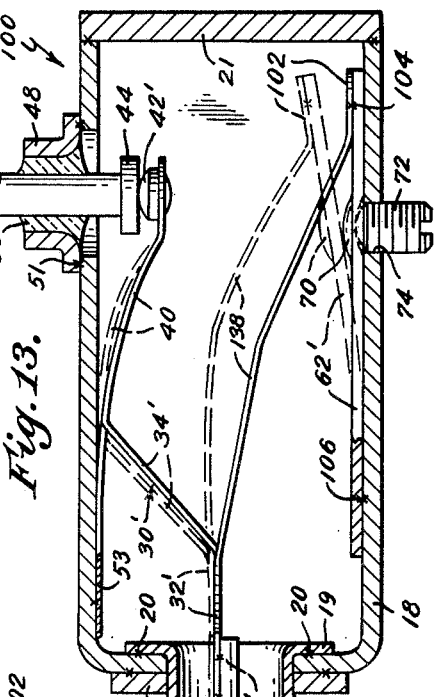
FIG. 13 is a view similar to FIG. 12 partly broken away, with relative movement between parts in response to calibration adjustment, being indicated in dashed lines.

*Embodiment of FIGS. 11–13*

In FIGS. 11–13 is shown another embodiment of the present invention in the form of a thermostatic switch, generally indicated by numeral 100, wherein like numerals designate parts like those of switch 10 in the FIGS. 1–10 embodiment. Thermostatic switch 100 is also a grounded type hermetically sealed construction and is generally similar to switch 10, except as noted hereinafter. Rod 14' is similar to rod 14, but does not include the necked-down portion 15. Motion amplifying means 30' is generally Y-shaped in configuration, as seen in FIGS. 12 and 13, and includes a base leg 32' secured to end 24' of rod 14', and two pairs of diverging motion amplification generating legs or members 34', 36' and 138, 139. The pair of legs 138 and 139 correspond to single motion amplification generating leg 38 of switch 10. Integrally formed with diverging pairs of legs 34', 36' and 138, 139 and base leg 32, is an actuator member 40' which is secured at end portion 53 thereof to casing 18, as by welding. Mounted at the free end of actuator leg 40 is a contact 42' which is positioned for mating engagement with contact 44. The free end 102, which interconnects legs 138 and 139, is fixedly secured to the free end of a support member 62', as by welding at 104. Support member 62' is similar to support means 62 of thermostatic switch 10, but is connected, at its end closest to end 24' of rod 14', to casing 18, as by welding at 106, for pivotal movement relative to housing 18. In this respect, support 62' differs from support 62 of thermostat 10 which is anchored or secured to casing 18 at an end 64 thereof, which is remote from the end 24 of rod 14. End 102 is connected adjacent the free end of support 62' rather than to a tab 60 intermediate the ends of support 62 (in the switch 10 embodiment) thereby affording greater movement of parts when screw 72 is rotated for calibration purposes. Thermostat 100 also provides for calibration in the manner described above for switch 10, by means of adjusting screw 72 which engages a dimpled portion 70 provided in support member 62'.

The operation and method of calibration of switch 100 is substantially identical (except as otherwise noted herein) to that described above for switch 10. Switch 100 provides substantially all the advantages described above in connection with switch 10.

In FIG. 12 is shown the relative motion that takes place upon differential movement of rod 14' and tube 12 upon heating thereof to a predetermined operating temperature, pivoting or bending of rod 14' taking place adjacent its connection with tube 12. FIG. 13 illustrates the relative movement of parts which takes place when adjusting screw 72 is rotated to calibrate the device. In the FIG. 12 embodiment, when differential expansion of tube 12 and rod 14' takes place upon heating of the device 100 to the operating temperature point, base leg 32 and pairs of diverging legs 34', 36' and 138, 139 will act as tension members, and the portion of actuator 40 between junction G and the point of connection of portion 53 of the actuator 40 will act as a compression member.

*Embodiment of FIGS. 14–16*

Referring now to FIG. 14, there is shown a thermostatic switch generally referred to by numeral 200, according to a third form of the invention, in which like numerals designate parts like those of the FIGS. 1–10 embodiment. Thermostatic switch 200 is of a hermetically sealed construction. The open end of housing 18 is sealed by means of an end plate having an aperture 204 and a conventional glass-to-metal header disposed in aperture 204. Plate 202 is fixedly secured to housing 18, as by welding as shown. The glass-to-metal header plate comprises a flanged ring or sleeve 206 and a glass sealant 208. Mounted in the glass sealant 208 are two electrically conductive terminals in the form of pin members 210 and 212 which extend exteriorly of switch 200, and are maintained in rigidly spaced, electrically insulated relation to each other and to the casing 18, by the glass sealant 208. Flange 214, provided by ring or sleeve 206, is disposed about end plate 202 and is welded thereto at circumferentially spaced points 216 to tightly secure the header plate to the switch and to maintain the hermetically sealed integrity of the switch.

Switch 200 includes a rigid electrically conductive terminal member 220 cantilever mounted on and electrically connected to the interior end of terminal 212, as by welding. As best seen in FIG. 14, rigid terminal member 220 provides a stationary electrical contact 244 at its free end, as clearly shown. Member 220 provides an aperture 222 in which is disposed a bushing 224 formed of electrically insulated material. Slidably received within bushing 224, for reciprocal movement therein, is a motion transfer pin 226 formed of electrically insulated material. Thermostatic switch 200 includes a spring arm 230 formed of electrically conductive material, such as for example, beryllium copper. Spring arm 230 is cantilever mounted on the interior free end of terminal 210, as by welding, as best seen in FIG. 14. Cantilever mounted contact spring member 230 provides an electrical contact 242 at the upper side of the free end thereof positioned for mating engagement with stationary contact 244 carried by terminal member 220. Contact spring member 230 includes an abutment in the form of a deformed or dimpled portion 248, which as clearly shown in FIGS. 14 and 15, is aligned for engagement with motion transfer pin 226. Spring arm 230 is biased upwardly, as seen in FIG. 14, to constantly urge contact 242 into mating engagement with stationary contact 244. Actuator arm 40' differs from actuator arm 40 of thermostatic switch 10 in that instead of carrying an electrical contact at its free end, it is provided with an abutment portion in the form of a dimple 250 which is adapted to engage the upper side of transfer pin 226 to effect movement of spring arm 230 from the contacts-closed position, shown in solid lines in FIG. 14, to the contacts-open position, shown in dashed lines in this figure. The weight of motion transfer pin 226 and spring rate of spring arm 230 are such that the weight of pin 226 does not influence the movement of the spring arm 230 to open or close the contacts.

Except as noted above and hereinafter, the remainder of thermostat 200 is substantially identical to thermostat 10 described above. Switch 200 is shown in FIG. 14 in the calibrated position, support member 62 and adjusting screw 72 having been moved from the dashed line to the solid line calibrated position shown therein. When switch 200 is heated to its calibrated operating temperature differential, expansion and displacement will take place to move rod 14, the motion amplification means 30 and actuating arm 40 from the solid to the dashed line position, as shown in FIG. 14. Actuating arm 40, in moving from the solid to the dashed line position in FIG. 14 in response to predetermined thermal change, will move contact arm 230 from the solid to the dashed line positions, as shown in FIG. 14, to open the contacts 242 and 244. When switch 200 cools sufficiently so that rod 14, motion amplification means 30 and actuating arm 40 move from the dashed line position back to the solid line position, contact arm 230 will move from the dashed line to the solid line contacts-closed position, shown in FIG. 14, under its resilient spring biasing force. This contacts-closing movement of spring arm 230 will also cause upward movement of transfer pin 226 within bushing 224, as seen in FIG. 14. Except as noted above, operation and the method of calibration of switch 200 is substantially identical to that described above for switch 10. Switch 200 also provides substantially all of the advantages described above in connection with thermostats 10 and 100.

*Embodiment of FIGS. 17–19*

In FIGS. 17–19 is shown a thermostatic switch generally referred to by numeral 300, according to a further embodiment of the present invention, in which like numerals designate parts like those in switch 10 of the FIGS. 1–10 embodiment. Thermostat 300 is a grounded type hermetically sealed switch, and differs from thermostat 10 mainly in the arrangement of the motion amplification means and actuator arm, and in the mounting of the stationary contact.

The actuating arm member 340 of switch 300 is formed separate from, rather than integrally with, the motion amplification means, in contrast to the switch 10 construction. Referring now to the drawings, the motion amplification means of the FIG. 17 embodiment is generally referred to by numeral 330, and is substantially Y-shaped in form. Means 330 includes a base leg 332 (corresponding to base leg 32 of means 30) integrally formed with leg members 338, 339 and diverging leg 334. Single diverging leg 334 and legs 338, 339 correspond in function respectively to legs 34, 36 and 38 of thermostat 10, and function as motion amplification generating members, substantially in the manner described above for their respective counterparts in thermostat 10. Legs 338, 339 which co-operate with diverging leg 334 and base leg 332 to form the Y-shaped or bifurcated configuration shown in FIG. 17, are integrally connected by a portion 370 which includes a bent tab portion 372, as clearly seen in FIG. 19. Bent tab portion 372 is directly connected to support members 62', as by welding at 374, as best seen in FIGS. 17 and 19. Support member 62', except for omitting struck-out tab 60, is substantially identical with support member 62 in the FIGS. 1–10 embodiment. Support members 62', in the FIG. 17 embodiment, includes a dimpled portion 70 which is engageable with an adjusting calibrating screw 72, which is threadedly received within a threaded aperture 74 provided in base 18, as clearly shown. Support member 62' is welded to casing 18 in the FIG. 17 embodiment at one end 64' thereof, as by welding at 65'. Base leg 332 is connected to end 24 of rod 14, as by welding. The free end of motion amplification generating leg 334 includes a bent tab portion 336, which is connected to a portion of actuating member 340 intermediate its end, as by welding at 337. Actuating member 340 includes a bent tab portion 341, at one end thereof, which is electrically connected and secured to casing 18, as by welding at 343. In the FIG. 17 embodiment, the flange 19 of tube 12 has been omitted, but it will be understood that tube 12 is fixedly connected with housing 18, as by welding at circumferentially spaced points, as at 320. Mounted at the free end of actuator member 340, is an electrical contact 342 which is adapted to move into and out of mating engagement with a stationary electrical contact 344. Stationary electrical contact 344 is carried by an electrically conductive terminal 346. Terminal 346 is mounted on and maintained in electrically insulated relation with respect to metallic housing 18, by means of an electrically insulating bushing 348 (which is received within an appropriately shaped aperture 349 provided in housing 18) and an electrically insulating washer 348', as shown. Terminal member 346 may take the form of a rivet, and includes a lead 347 secured thereto for electrical connection of thermostatic switch 300 to an external circuit. The mounting of terminal 346 is such as to maintain the hermetically sealed integrity of switch 300.

In FIG. 18 is shown a plan view of a blank from which motion amplifying means 330 can easily be formed. Forming of the blank is accomplished merely by bending the parts along the dashed lines, as shown in FIG. 18. Operation of and the method of calibration of switch 300 in the FIGS. 17–19 embodiment is substantially similar to that described above for thermostat 10 in the FIGS. 1–10 embodiment. Thus, when the switch 300 is at or near its operating temperature point, the parts will move from the solid to the dashed line positions shown in FIG. 17 to open contacts 342 and 344. Switch 300 provides substantially all of the advantages described above for switch 10.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A motion amplifying device comprising a first means connected to a condition responsive means which is movable in response to predetermined changes in condition thereof; a first motion amplification generating member connected at one part thereof with said first means and connected at another part thereof with a first portion of a support for movement relative to said first means and support; a second motion amplification generating member connected at one part thereof with and for movement relative to each of said first means and said first motion amplification generating member; an elongated actuator arm connected with a second portion of said support for movement relative thereto; said second motion amplification generating member extending at an angle greater than 0° but less than 180° to said actuator member and being connected at another part thereof with said actuator member, for amplified movement thereof in response to movement of said condition responsive means and said first and second motion amplification generating members each being disposed at an angle greater than 0° but less than 180° to said first means.

2. A motion amplifying device comprising a first means connected to a condition responsive means which is movable in response to predetermined changes in condition thereof; a first motion amplification generating member connected at one part thereof with said first means and connected at another part thereof with a first portion of a support; a second motion amplification generating member connected at one part thereof with and for movement relative to each of said first means and said first motion amplification generating member; an actuator member connected with a second portion of said support for movement relative thereto; said second motion amplification generating member extending at an angle greater than 0° but less than 180° to said actuator member and being connected at another part thereof with and for movement relative to said actuator member, for amplified movement thereof in response to movement of said condition responsive means, said first and second motion amplification generating members being angularly disposed relative to each other and forming a substantially Y-shaped configuration with said first means.

3. A thermally responsive device comprising thermally responsive means having a part thereof movable in response to predetermined temperature change, a support mounting said thermally responsive means; motion amplifying means including a first member interconnected with said part for movement therewith in response to temperature change; a second member disposed at an angle to said first member and being interconnected, adjacent one end thereof, with said first member for movement relative thereto, said second member, adjacent the other end thereof, being interconnected with said support for pivotal movement relative thereto; a third member disposed at an angle to and interconnected adjacent one end thereof with said first and second members; said first, second, and third members defining a substantially Y-shaped configuration; an actuator member connected adjacent one end thereof with said support in spaced relation to said second member for pivotal movement relative to said support; said third member extending at an angle greater than 0° but less than 180° to said actuator member and being interconnected, adjacent the other end thereof, with said actuator member at a part thereof spaced from said one end of said actuator member.

4. A thermostatic device comprising thermally responsive means for generating movement in response to predetermined thermal changes; motion amplifying means for amplifying the movement generated by said thermally responsive means; said motion amplifying means including a member connected to said thermally responsive means for movement therewith in response to predetermined temperature changes; a first motion amplification generating member connected at one part thereof with said member and connected at another part thereof with a first portion of a support means for restraining longitudinal movement of said first motion amplification generating member; a second motion amplification generating member connected at one part thereof with said member and said first motion amplification generating member; an actuator member connected with a second portion of said support means and mounted for pivotal movement relative thereto; and said second motion amplification generating member extending at an angle greater than 0° but less than 180° to said actuator member and being connected at another part thereof with said actuator member, for amplified pivotal movement thereof in response to movement of said thermally responsive means and motion amplifying means and said first and second motion amplification generating members each being disposed at an angle greater than 0° but less than 180° to said first named member.

5. A thermostatic device comprising thermally responsive means for generating movement in response to predetermined thermal changes; motion amplifying means for amplifying the movement generated by said thermally responsive means; said motion amplifying means including a member connected to said thermally responsive means for movement therewith in response to predetermined temperature changes; a first motion amplification generating member connected at one part thereof with said member and connected at another part thereof with a first portion of a support means for restraining longitudinal movement of said first motion amplification generating member; a second motion amplification generating member connected at one part thereof with each of said member and said first motion amplification generating member; an actuator member connected with a second portion of said support means and mounted for pivotal movement relative thereto; said second motion amplification generating member extending at an angle greater than 0° but less than 180° to said actuator member and being connected at another part thereof with said actuator member, for amplified pivotal movement thereof in response to movement of said thermally responsive means and motion amplifying means; and said first and second motion amplification generating members being angularly disposed relative to each other and forming a substantially Y-shaped configuration with said member.

6. The device as set forth in claim 5 and wherein said first and second motion amplification generating members and said member are formed integrally.

7. The device as set forth in claim 5 and wherein said first and second motion amplification generating members, said member and said actuator member are formed integrally.

8. A thermostatic device comprising a base, thermally responsive means carried by said base for generating movement in response to predetermined thermal changes; motion amplifying means for amplifying the movement generated by said thermally responsive means comprising a member connected to said thermally responsive means for movement therewith in response to thermal changes; a first motion amplification generating member connected at one part thereof with said member and connected at another part thereof with support means on said base for restraining longitudinal movement of said first motion amplification generating member and for movement relative to said member and support means; a second motion amplification generating member connected at one part thereof with and for movement relative to each of said member and said first motion amplification generating member; an actuator member connected with said base and mounted for pivotal movement relative thereto; said second motion amplification generating member extending at an angle greater than 0° but less than 180° to said actuator member and being connected at another part thereof with said actuator member, for amplified pivotal movement thereof in response to movement of said thermally responsive means and motion amplifying means; calibrating means engageable with said support means for changing the position of said support means relative to said base and the position of at least that of said first and second motion amplification generating members to calibrate said thermostatic device for desired operation at predetermined temperature conditions and said first and second motion amplification generating members each being disposed at an angle greater than 0° but less than 180° to said first named member.

9. A thermostatic switch comprising a housing; a first member formed of a material having a first coefficient of thermal expansion and connected to said housings; a second member connected with said first member and formed of a material having a coefficient of thermal expansion, which is different from said first first coefficient of thermal expansion, whereby relative movement between said first and second members will take place in response to thermal change; said switch including a pair of electrical contacts; one of said contacts being mounted for movement into and out of engagement with the other of said contacts; motion amplifying means for amplifying the relative movement between said members; said means including a segment connected to said second member for movement therewith in response to predetermined temperature changes; a first motion amplification generating member connected at one part thereof with said segment and connected at another part thereof to support means on said housing for restraining longitudinal movement thereof; a second motion amplification generating member connected at one part thereof with each of said segment and said first motion amplification generating member; an actuator member supported by said housing for pivotal movement relative thereto; said second motion amplification generating member extending at an angle greater than 0° but less than 180° to said actuator member and being connected at another part thereof with said actuator member for amplified movement thereof in response to relative movement between said first and second members; said actuator member being operatively connected with said one contact for actuating said contacts in response to movement of said actuator member; and said first and second motion amplification generating members being angularly disposed relative to each other and defining a substantially Y-shaped configuration with said segment.

10. A thermostatic switch comprising a housing; a first member formed of a material having a first coefficient of thermal expansion; a second member connected with said first member and formed of a material having a coefficient of thermal expansion which is different from said first coefficient of thermal expansion, whereby relative movement between said members will take place in response to thermal change; said switch including a pair of electrical contacts; one of said contacts being mounted for movement into and out of engagement with the other of said contacts; motion amplifying means for amplifying the relative movement between said members; said means including a segment connected to said second member for movement therewith in response to predetermined temperature changes; a first motion amplification generating member connected at one part thereof with said segment and connected at another part thereof to support means on said housing for movement relative to said segment and support means and for restraining longitudinal movement of said first motion amplification generating member; a second motion amplification generating member connected at one part thereof with each of said segment and said first motion amplification generating member; an actuator member supported by said housing for pivotal movement relative thereto; said second motion amplification generating member extending at an angle greater than 0° but less than 180° to said actuator member and being connected at another part thereof with said actuator member for amplified movement thereof in response to relative movement between said first and second members; said actuator member being operatively connected with said one contact for actuating said contacts in response to movement of said actuator members; calibrating means engageable with said support means for changing the position of said support means and at least that of said first and second motion amplification generating members to calibrate said thermostatic switch for desired operation at predetermined temperature conditions and said first and second motion amplification generating members each being disposed at an angle greater than 0° but less than 180° to said segment.

11. The switch as set forth in claim 9 and wherein said first member comprises a tube and said second member comprises a rod secured adjacent one end thereof to said tube.

12. A thermostatic switch comprising a housing including a tubular member formed of a material having a first coefficient of thermal expansion; an elongated member disposed within and connected at one end thereof with said tubular member and formed of a material having a coefficient of thermal expansion which is different from said first coefficient of expansion; a motion amplifying member disposed in said housing and connected at one portion thereof to the free ends of said elongated member; another portion of said motion-amplifying member being bifurcated providing first and second leg portions; the free end of said first leg portion being connected with support means on said housing restraining said first leg portion against movement longitudinally thereof; an actuator member supported adjacent one end thereof by said housing for movement relative to said housing; switch means associated with the other end of said actuator member for actuation by said actuator member in response to movement thereof; said second leg portion extending at an angle greater than 0° but less than 180° to said actuator member and being interconnected with a portion of said actuator member intermediate its ends for amplified movement thereof to actuate said switch means in response to predetermined thermal change and said first and second leg portions each being disposed at an angle greater than 0° but less than 180° to said one portion of said motion amplifying member.

13. A thermostatic switch comprising a housing including a tubular member formed of a material having a first coefficient of thermal expansion; an elongated member disposed within and connected at one end thereof with said tubular member and formed of a material having a coefficient of thermal expansion which is different from said first coefficient of thermal expansion; a motion amplifying device disposed within said housing and including a base leg interconnected with intersecting first and second diverging legs at the intersection thereof defining a substantially Y-shaped configuration; said base leg being connected to said elongated member; the free end of said first leg being connected with support means on said housing for movement relative to said support means and restraining said first leg against movement longitudinally thereof; an actuator member supported adjacent one end thereof by said housing for movement relative to said housing; switch means associated with the other end of said actuator member and operable by said actuator member in response to movement thereof; said second leg extending at an angle greater than 0° but less than 180° to said actuator member and being interconnected with a portion of said actuator member intermediate its ends for amplified movement thereof to operate said switch means in response to predetermined thermal change.

14. A motion amplifying device comprising a first member connected to a condition responsive means which is movable in response to predetermined changes in condition thereof; a first motion amplification generating member connected at one part thereof with said first member and connected at another part thereof with support means for movement relative to each of said first member and support means; a second motion amplification generating member connected with and for movement relative to said first member and first motion amplification generating member; a movably mounted actuator member; said second motion amplification generating member extending at an angle greater than 0° but less than 180° to said actuator member and being connected with said actuator member, for amplified movement thereof in response to movement of said condition responsive means, said first and second motion amplification generating members being angularly disposed relative to each other and defining a substantially Y-shaped configuration with said first member; and calibrating means engageable with said support means for changing the position of said support means and that of said first and second motion amplification generating members to calibrate said device for desired operation at predetermined conditions.

15. A thermostatic switch comprising a housing, at least a portion of which is formed of a material having a first coefficient of thermal expansion; a member connected with said portion of said housing and formed of a material having a coefficient of thermal expansion which is different from said first coefficient of thermal expansion; a motion amplifying member disposed longitudinally of said housing; said motion amplifying member being of substantially Y-shaped configuration including a base leg interconnected with first and second diverging legs at the apex thereof; said base leg being connected to said first-named member; the free end of said first leg being connected with support means on said housing restraining said first leg against movement longitudinally thereof; an actuator member supported adjacent one end thereof by said housing for movement relative to said housing; switch means associated with the other end of said actuator member and operable by said actuator member in response to movement thereof; said second leg extending at an angle greater than 0° but less than 180° to said actuator member and being interconnected with a portion of said actuator member intermediate its end for amplified movement thereof to operate said switch means in response to predetermined thermal change; and calibrating means engageable with said support means for changing the position of said support means, base leg and at least that of said first and second diverging legs to calibrate said thermostatic switch for desired operation at predetermined temperature conditions.

16. A thermally responsive electrical switch comprising a housing; a tube having an open and a closed end; said tube being supported by and mounted on said housing adjacent its open end; said tube being formed of a material having a first coefficient of thermal expansion; a rod formed of material having a coefficient of thermal expansion which is different from said first coefficient of thermal expansion; said rod being disposed within said tube and extending lonigtudinally thereof; said rod adjacent one end thereof being connected to said tube; a substantially Y-shaped motion amplifying device disposed in said housing for amplifying relative motion between said rod and tube generated in response to thermal change; said motion amplifying device including a base leg and a pair of intersecting diverging interconnected legs connected at their intersection to said base leg; said base leg being connected to the other end of said rod for movement therewith; one of said diverging legs being connected adjacent the free end thereof to a support member provided on said housing; a pair of electrical contacts in said housing; one of said contacts being mounted for movement into and out of engagement with the other of said contacts; an elongated actuator member connected adjacent one end thereof with said housing for movement relative thereto; said actuator member adjacent its other end being operatively associated with said one contact for moving the latter relative to said other of said contacts; the other of said diverging legs of said motion amplifying device extending at an angle greater than 0° but less than 180° to said actuator member and being connected adjacent the free end thereof to said actuator member at a portion intermediate the ends of said actuator member.

17. The switch as set forth in claim 16 and wherein said support member comprises an elongated plate-like member connected adjacent one end thereof to said housing for movement relative thereto; said one of said diverging legs being connected to a portion of said support member intermediate the ends thereof; an adjusting screw threadedly mounted on said housing and engageable with said plate-like member adjacent the free end thereof for varying the position of said support member, said motion amplifying device and said other end of said rod, to calibrate said thermostatic switch for desired operation at predetermined temperature conditions.

18. The switch as set forth in claim 17 and wherein a portion of said plate-like support member adjacent the end thereof remote from said one end of said rod, is connected to said housing.

19. The switch as set forth in claim 17 and wherein a portion of said plate-like support member adjacent the end thereof closest to said one end of said rod, is connected to said housing.

20. The switch as set forth in claim 16 and wherein said one of said contacts is mounted on and electrically connected to said actuator member and means mounting said other of said contacts in electrically insulated supportive relation to said housing.

21. The switch as set forth in claim 20 and wherein said switch housing and tube comprise a hermetically sealed enclosure.

22. The switch as set forth in claim 16 and wherein said one of said contacts is carried by and electrically connected to a movably mounted contact carrier and means mounting said other of said contacts in electrically insulated supportive relation to said housing; and motion transfer means interposed between said contact carrier and a portion adjacent the other end of said actuator member.

23. The switch as set forth in claim 16 and wherein said base leg and pair of diverging legs of said motion amplifying device are formed integrally.

24. The switch as set forth in claim 23 and wherein said motion amplifying device and said actuator member are formed integrally.

25. The switch as set forth in claim 23 and wherein said actuator member is formed separately from said motion amplifying device.

26. A motion amplifying device comprising a substantially Y-shaped member having a base leg and a pair of intersecting diverging interconnected legs connected at their intersection to said base leg; said base leg being connected at its free end with means movable under predetermined conditions; one of said diverging legs being connected to support means to restrain longitudinal movement thereof; the other of said diverging legs extending at an angle greater than 0° but less than 180° to an actuator member and being connected to an actuator member at a portion spaced from one end of said actuator member to impart amplified movement of said movable means to said actuator member, said actuator member being mounted on said support means in spaced relation to said one of said diverging legs.

27. The switch as set forth in claim 16 and wherein said other of said diverging legs comprises a pair of spaced elongated members each disposed on a respective side of said one of said diverging legs.

28. A thermally responsive electrical switch comprising a housing, thermally responsive means carried by said housing for generating movement in response to predetermined thermal change; a substantially Y-shaped motion amplification device for amplifying the movement generated by said thermally responsive means, said device including first, second and third legs each disposed at an angle to each other to define said Y-shape, said first leg being secured to a portion of said thermally responsive means for movement therewith in response to temperature change, a support mounted on said housing, said second leg being secured to said support, an actuating arm cantilever mounted adjacent one end thereof on said housing in spaced relationship to said support, said third leg being secured to said actuator arm intermediate the ends of said actuator arm, said switch including a pair of electrical contacts one of which is carried by said housing and the other of which is mounted on said actuator arm adjacent the other end thereof for movement into and out of engagement with said one contact, said second and third legs respectively forming first and second motion amplification generating members for amplifying the movement generated by said thermally responsive means and for transmitting such amplified movement to the actuator arm to cause the latter to move in response to movement generated by said thermally responsive means to actuate said contacts, calibrating means engageable with said support for moving said support relative to said housing and to move said second and third legs to vary the stress in said motion amplification device to calibrate said thermostatic switch for desired operation at predetermined temperature conditions.

References Cited in the file of this patent

UNITED STATES PATENTS

| | | |
|---|---|---|
| 2,664,483 | Broekhuysen | Dec. 29, 1953 |
| 2,798,134 | Geer | July 2, 1957 |
| 2,817,731 | DeFalco | Dec. 24, 1957 |
| 2,910,571 | Schwaneke | Oct. 27, 1959 |

FOREIGN PATENTS

| | | |
|---|---|---|
| 846,134 | Great Britain | Aug. 24, 1960 |
| 651,151 | Great Britain | Mar. 14, 1961 |
| 161,642 | Sweden | Dec. 10, 1957 |